United States Patent [19]

Jones

[11] 4,055,161
[45] Oct. 25, 1977

[54] SOLAR ENERGY COLLECTOR AND SUN TRACKING CONCENTRATOR

[76] Inventor: Robert L. Jones, 3410 Truman, El Paso, Tex. 79930

[21] Appl. No.: 641,242

[22] Filed: Dec. 16, 1975

[51] Int. Cl.² .............................................. F24J 3/02
[52] U.S. Cl. .................................... 126/271; 126/270
[58] Field of Search ................ 126/270, 271; 237/1 A

[56] References Cited

U.S. PATENT DOCUMENTS

| 2,205,378 | 6/1940 | Abbot | 126/271 |
|---|---|---|---|
| 2,872,915 | 2/1959 | Bowen | 126/271 |
| 2,907,318 | 10/1959 | Awot | 126/271 |
| 2,969,788 | 1/1961 | Newton | 126/271 |
| 3,273,558 | 9/1966 | Boothe | 126/271 |
| 3,861,379 | 1/1975 | Anderson, Jr. | 126/271 |
| 3,884,414 | 5/1975 | Baer | 126/271 |
| 3,915,147 | 10/1975 | Rineer | 126/271 |

Primary Examiner—Kenneth W. Sprague
Attorney, Agent, or Firm—Clarence A. O'Brien; Harvey B. Jacobson

[57] ABSTRACT

Automatic tracking of a source of radiant energy to pivotally displace an energy collector panel assembly for optimum concentration of the radiant energy absorbed. Changes in magnitude and/or location of the source relative to the collector produces a change in differential air pressure in a sensor to displace the center of mass of a gravitational drive device through which tracking movement is imparted to the collector panel assembly.

19 Claims, 21 Drawing Figures

SOLAR ENERGY COLLECTOR AND SUN TRACKING CONCENTRATOR

Adjustably positioned solar energy collectors are well known as disclosed for example in U.S. Pat. Nos. 1,683,266 and 2,969,788. Solar energy collectors having automatic tracking facilities are also well known as disclosed for example, in U.S. Pat. Nos. 1,386,781, 2,872,919, 2,969,918, 3,171,403, 3,861,379 and 3,868,823. Aside from the rather complex mechanisms often utilized in connection with the automatic tracking facilities, prior art arrangements as disclosed in the aforementioned patents rely on externally powered motor devices for automatic tracking movement of the collector panel assembly. Such prior art arrangements are therefore costly to operate and consume energy that must be derived from other energy sources and are also unreliable and subject to inoperativeness because of power interruptions. It is therefore an important object of the present invention to provide a solar energy collector of the automatic tracking type that does not rely upon any externally powered motor devices for effecting tracking movement of the collector panels nor any complex timing systems or optical lens systems.

In accordance with the present invention, a solar energy collector device especially suitable for residences and small industrial installations, is adapted to be mounted on the roof of a building. The solar energy collector unit includes a pivotally displaceable reflector panel and receiver tube within which a fluid heating medium is contained for absorbing radiant energy concentrated onto the tube by the reflector panel. The energy collector unit features automatic tracking facilities in the form of a gravitational drive device, the center of mass of which is shifted by a differential air pressure signal received from an air pressure sensor. The differential pressure sensor includes a pair of air chambers insulated from each other and adapted to receive radiant energy from different directions. The collector unit is so positioned relative to the source of radiant energy, such as the sun, as to produce differential heating of the two air chambers associated with the differential pressure to thereby develop a differential air pressure signal communicated to the gravitational drive device causing it to become unbalanced. Balance of the drive device is restored by repositioning of the reflector panel drivingly connected thereto.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 1:
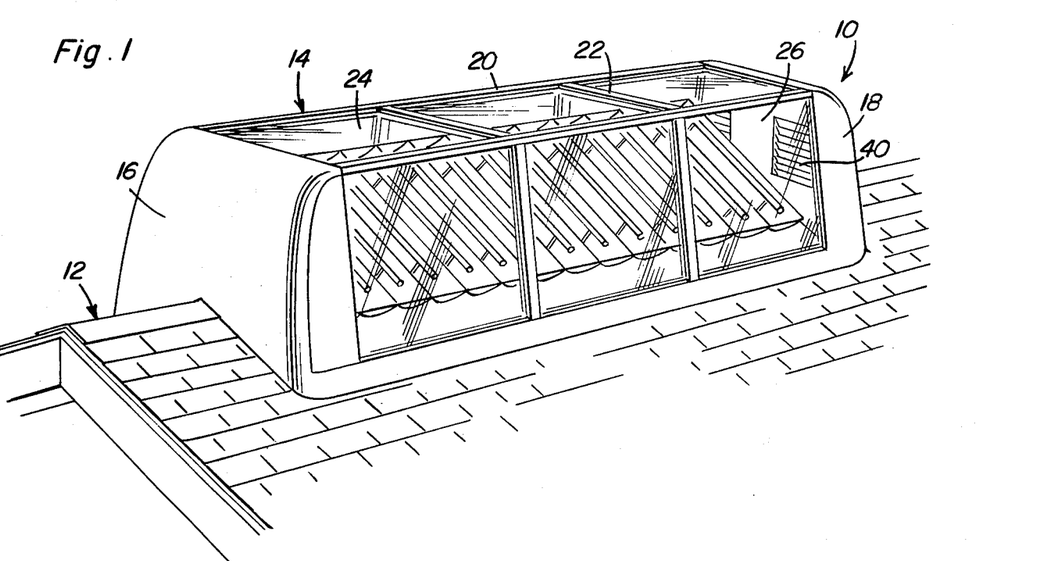
FIG. 1 is a perspective view showing a typical installation of a solar energy collector unit constructed in accordance with one embodiment of the present invention.
Figure 2:
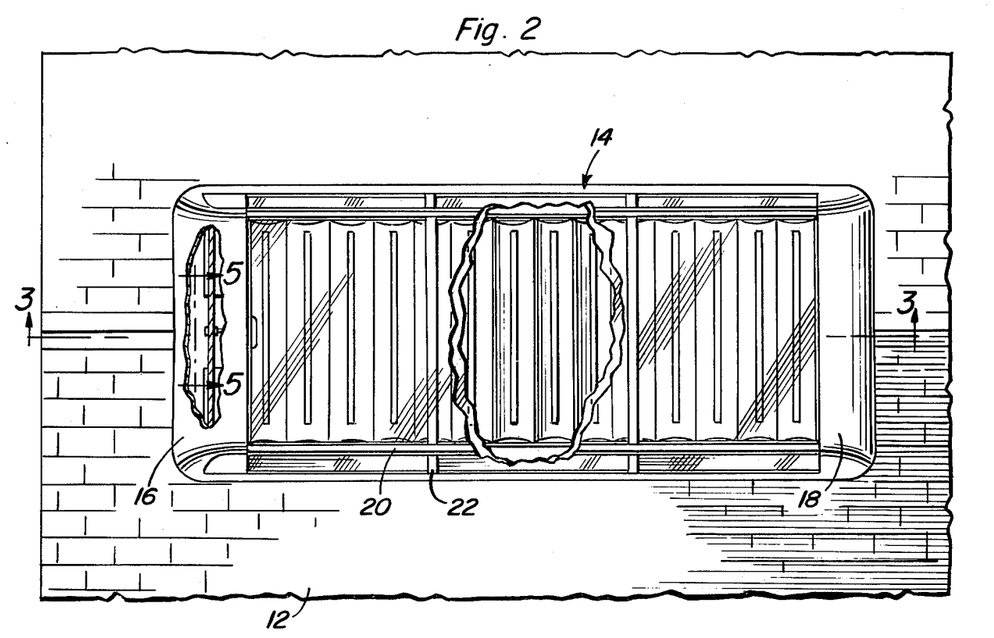
FIG. 2 is a top plan view of the solar energy collector unit shown in FIG. 1 with parts broken away and shown in section.

Referring now to the drawings in detail, FIG. 1 illustrates a solar energy collector unit generally referred to by reference numeral 10 adapted to be mounted on a gabled roof 12 of a residential home for example. Solar energy collector units constructed in accordance with the present invention may be mounted in other installations including those in which radiant energy is absorbed from sources other than the sun. The unit 10 as shown includes an exterior housing generally referred to by reference numeral 14 having opaque longitudinal end portions 16 and 18 that are interconnected by longitudinal frame members 20. Transverse frame members 22 are interconnected with the longitudinal frame members and cooperate therewith to support double pane transparent panels 24 on the top of the housing and 26 on the sides of the housing. The panels 24 are made of glass, plastic or other suitable materials. The interior of the external housing 14 is insulated from the roof by an insulating lining 28 made of a foam type material as shown in FIGS. 2 and 4.

Figure 3:
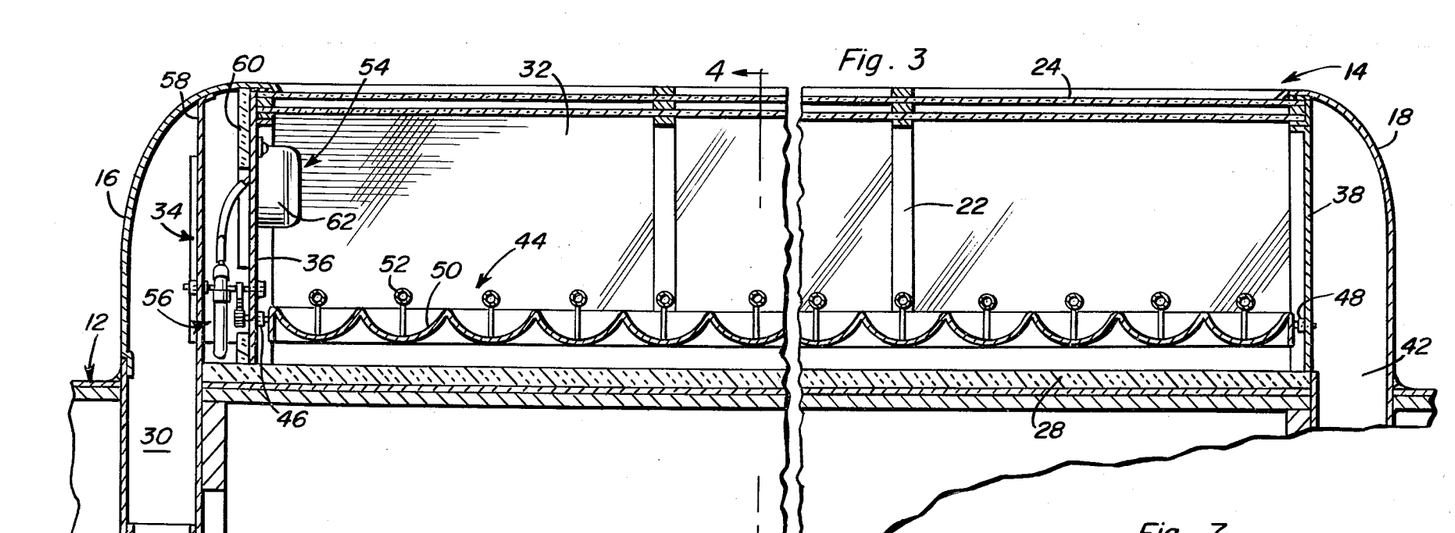
FIG. 3 is an enlarged partial, side sectional view taken substantially through a plane indicated by section line 3—3 in FIG. 2.
Figure 4:
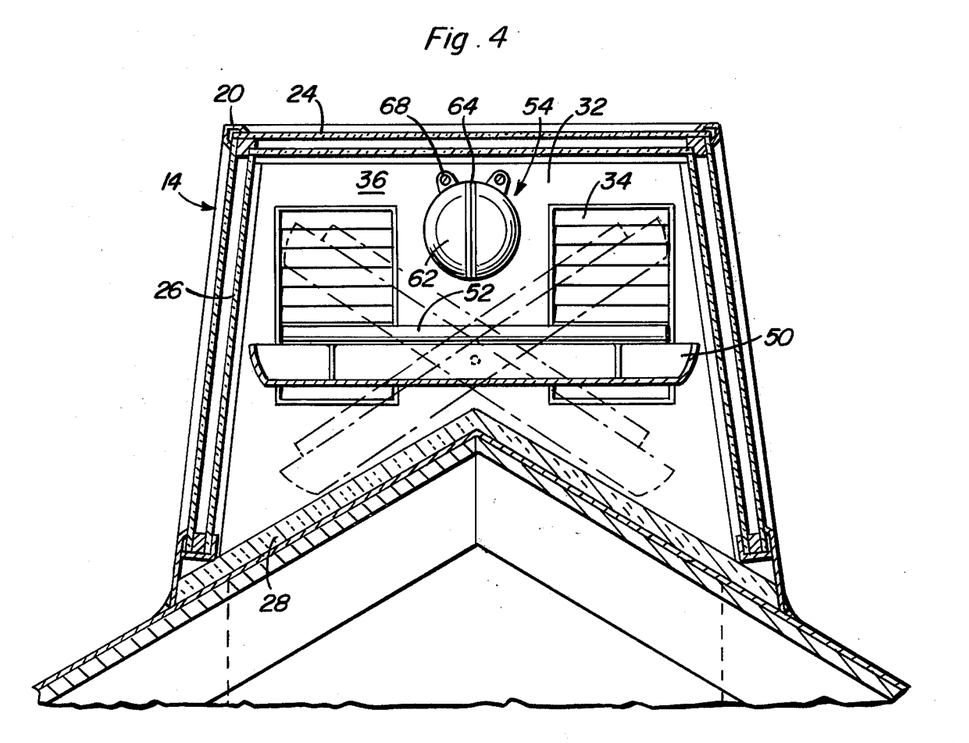
FIG. 4 is a transverse sectional view taken substantially through a plane indicated by section line 4—4 in FIG. 3.

As more clearly seen in FIGS. 3 and 4, the opaque end portion 16 of the housing 14 encloses an air intake duct 30 in fluid communication with an energy receiving chamber 32 through a pair of louvered inlet assemblies 34 formed in a partition wall 36. The other longitudinal end of the energy receiving chamber 32 between which the transparent panels 24 and 26 extend, is spaced from the opaque end portion 18 of the housing by an internal partition 38 within which a pair of louvered outlet assemblies 40 are mounted as shown in FIG. 1, the louver assemblies 40 being similar in construction to the louvered inlet assemblies 34 except as to size. The louvered outlet assemblies 40 provide fluid communication between the energy receiving chamber 32 and an outlet duct 42 formed within the opaque end portion 18 of the housing and are dimensioned somewhat larger than the inlet openings 34 in order to avoid any pressure buildup of air within the energy receiving chamber 32.

With continued reference to FIGS. 3 and 4, it will be apparent that solar energy will enter the energy receiving chamber 32 through the transparent panels 24 and 26 that form a trapezoidal cross section between the opaque end portions 16 and 18 of the unit housing. The solar energy radiation impinges upon an adjustably positioned solar energy concentrating assembly generally referred to by reference numeral 44 that is pivotally displaceable about a fixed horizontal axis established by spaced bearing assemblies 46 and 48 mounted at opposite longitudinal ends of the energy receiving chamber 32 by the partitions 36 and 38. In the embodiment illustrated in FIGS. 1–4, the solar energy concentrating assembly 44 is in the form of a plurality of interconnected reflector panels 50 of parabolic or other cross-sectional curvature adapted to concentrate or converge incident rays of solar or other radiant energy onto energy receiver tubes 52. The energy receiver tubes 52 are fixedly mounted just above the associated reflector panels 50 in order to radiate heat energy into the air stream conducted from one longitudinal end of the chamber 32 to the other between the intake and outlet ducts 30 and 42. The tubes 52 may be externally coated to form a radiant energy absorbing surface and may contain a heat absorbing and heat storing liquid. Accordingly, the radiant energy received on the refective surfaces of the reflector panels 50 will be concentrated onto the receiver tubes 52 and converted into heat energy stored therewithin from which the heat energy may be continuously transferred to air being conducted through the chamber 32 between the intake and outlet ducts.

Figure 6:
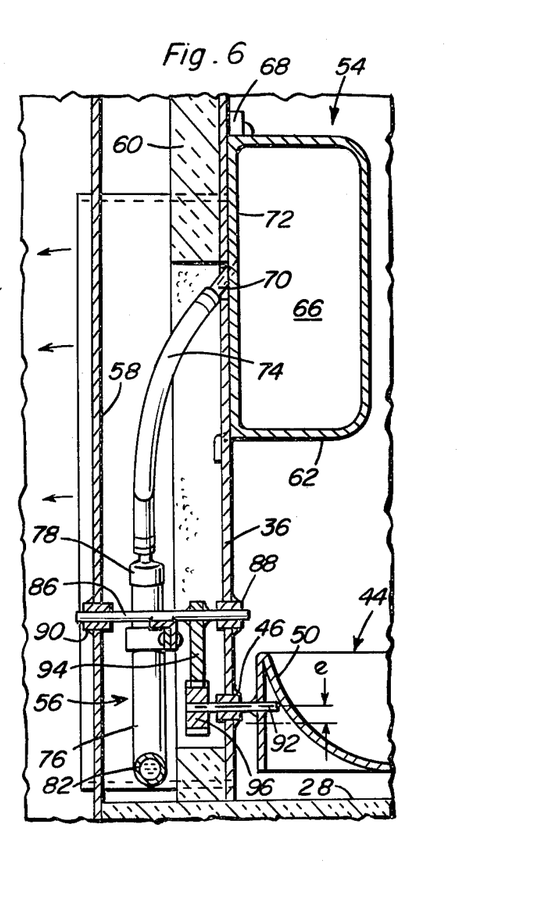
FIG. 6 is a partial side sectional view taken substantially through a plane indicated by section line 6—6 in FIG. 5.

As more clearly seen in FIGS. 3 and 6, the reflector panels 50 extend in parallel relationship to the straight receiver tubes 52 perpendicular to the fixed pivotal axes established by the bearing assemblies 46 and 48. The reflector panels 50 may therefore be pivotally adjusted between positions as shown by dotted line in FIG. 4 for optimum concentration of solar energy at all times of the day. The collector panel assembly 44 will therefore be automatically displaced in response to relative movement of the sun or any other source of radiant energy by means of automatic tracking facilities which includes a differential pressure sensor 54 and a gravitational drive device generally referred to by reference numberal 56. The differential pressure sensor 54 is mounted on the partition 36 for exposure to solar energy within the chamber 32 and is operatively connected to the gravitational drive device 56 enclosed within a space formed between the partition 36 and an internal wall 58. An insulating lining 60 is mounted on the partition wall 36 in order to prevent heat loss from the chamber 32, the insulation 60 being cut out to accommodate the gravitational drive device 56 and its connections to the differential pressure sensor 54 mounted on the opposite side of partition 36 above the automatically positioned collector panel assembly 44.

Figure 5:
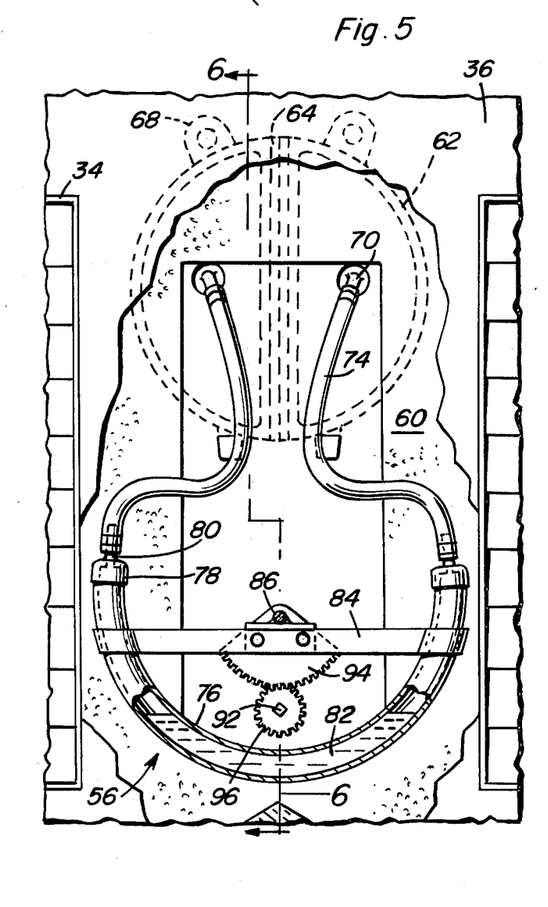
FIG. 5 is an enlarged partial sectional view taken substantially through a plane indicated by section line 5—5 in FIG. 2, with parts broken away and shown in section.

As shown in FIGS. 3, 4 and 6, the differential pressure sensor 54 includes a pair of semi-circular housings 62 having diametral portions confronting each other but spaced from each other by insulation 64. Each housing 62 faces one side of the chamber 32 through which solar energy enters and is made of a heat absorbing material in order to heat a body of air enclosed within a variable pressure chamber 66. Each housing 62 is fixedly mounted on the partition wall by a mounting ear 68 and is provided with a pressure signal outlet fitting 70 on its flat mounting wall 72 abutting the partition wall 36. A pair of flexible outlet tubes 74 are respectively connected to the pressure outlet fittings 70 as shown in FIGS. 5 and 6. It will be apparent that except when the sun is directly overhead, the pressure of the air within the two pressure sensing chambers 66 will be different depending on the differential heating of the air therein by the radiant energy impinging on the two housing sections 62 dependent on the relative location of the sun. The flexible tubes 74 connect the differential pressure sensor 54 to the gravitational drive device 56.

The gravitational drive device 56 responds to the differential pressure both as to magnitude and direction by effecting pivotal movement of the solar energy concentrating assembly 44. As more clearly seen in FIGS. 5 and 6, the gravitational drive device includes a rigid arcuate tube 76 the opposite open ends of which are closed by caps 78. Each of the caps has an inlet fitting 80 connected to one of the flexible tubes 74 from the differential pressure sensor. A body of liquid such as water 82 is contained within the tube 76 separating air spaces that are in fluid communication through the flexible tubes 74 with the differential air pressure chambers 66 of the differential pressure sensor 54. A bracket 84 is secured to the tube 76 above the body of water 82 and is connected to a pivot shaft 86. The pivot shaft is rotatably supported by bearings 88 and 90 in the partition 36 and wall 58 in parallel spaced relationship to a drive shaft 92 connected to the solar energy concentrating assembly 44 which is rotatably supported by the bearing 46 within the partition 36. The pivot shaft 86 is drivingly connected to the drive shaft 92 through a sector gear 94 connected to the pivot shaft and in mesh with a pinion gear 96 connected to the drive shaft 92. As shown in FIG. 6, the rotational axis of the drive shaft 92 is located slightly above the center of mass of the assembly 44 as indicated by distance e. Also, it will be apparent that in a gravitationally balanced condition, the center of mass of the tube 76 will be lower than that of the assembly 44.

In response to a difference in air pressure within the air pressure chambers 66 of the sensor, the body of water 86 in the balancing tube 76 of the gravitational drive device will be shifted thereby causing pivotal displacement of the tube 76 in order to restore balance. The pivotal dislacing force gravitationally imposed on the balancing tube 76 will be multiplied by the sector gear 94 and pinion 96 to thereby effectively transmit pivotal tracking movement to the assembly 44 in order to follow the movement of the source of radiant energy relative to the unit 10. Whenever the differential pressure sensed by the sensor 54 is removed either by overhead location of the solar source of energy or by extreme cloudiness, the gravitational drive device 56 and assembly 44 will be returned to a central position as shown by solid line in FIG. 4.

Figure 7:
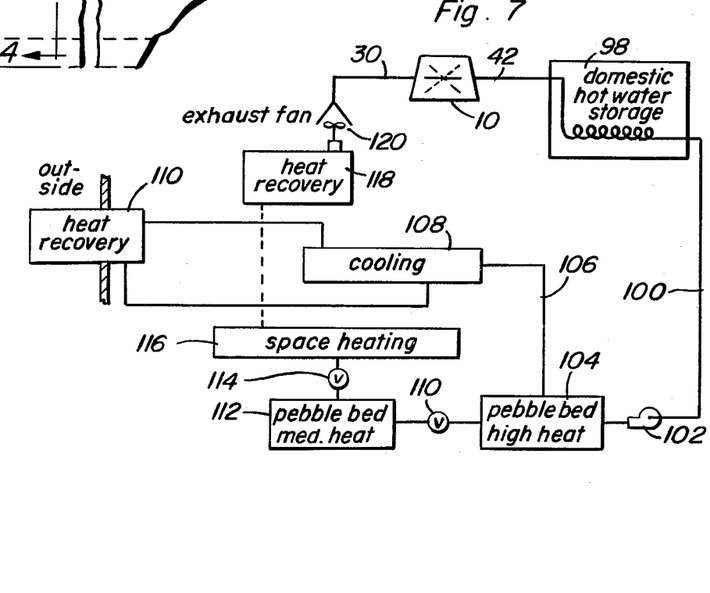
FIG. 7 is a schematic block circuit diagram showing a typical energy utilization system associated with the solar energy collector unit shown in FIGS. 1-6.

FIG. 7 depicts a typical system with which the solar energy collecting unit 10 may be utilized. The outflow of heated air from the unit 10 as shown is conducted by outlet duct 42 to a domestic hot water storage unit 98 within which some of the heat energy is removed from the heated air after which it is withdrawn through conduit 100 and injected by blower 102 into a pebble bed heat storage device 104. A high level of heat energy is stored within the pebble bed storage device 104. The high level heat storage device 104 may also receive heat from an air conditioning cooling unit 108 associated with an externally exposed heat recovery unit 110. Some of the heat stored in device 104 maybe withdrawn through a valve 110 for storage within a medium level heat storage device 112 from which heat is withdrawn through a valve 114 for use in connection with a space heating system 116. Excess heat from the space heating system 116 is absorbed by a heat recovery unit 118 and utilized to preheat air drawn into the intake duct 30 by an exhaust fan 120.

Figure 13:
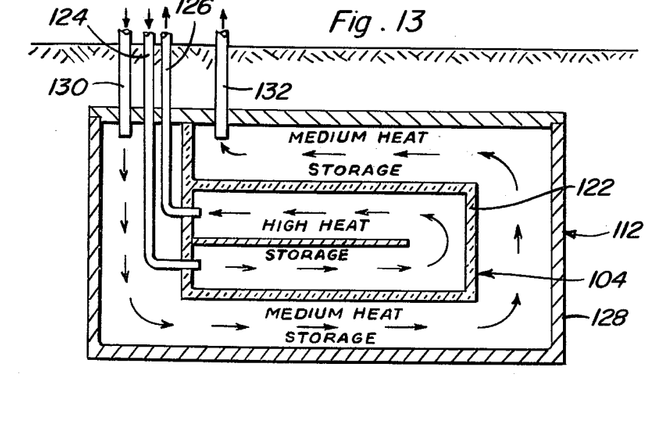
FIG. 13 is a simplified side sectional view through an energy storage unit adapted to be utilized with the energy collector unit of the present invention.

FIG. 13 illustrates a possible arrangement for the heat storage devices 104 and 112 diagrammed in FIG. 7 within an underground location. The high heat storage device 104 may be enclosed within heat insulating walls 122 made of a suitable insulating material such as gypsum board to enclose a pebble bed through which a flow of fluid heating medium is conducted between inlet and outlet conduits 124 and 126. The high level heat storing device 104 is positioned within the medium heat level storing device in the form of a concrete enclosure 128 housing the body of pebbles through which heated fluid flow is conducted between inlet and outlet conduits 130 and 132.

Figures 8, 9, 12:
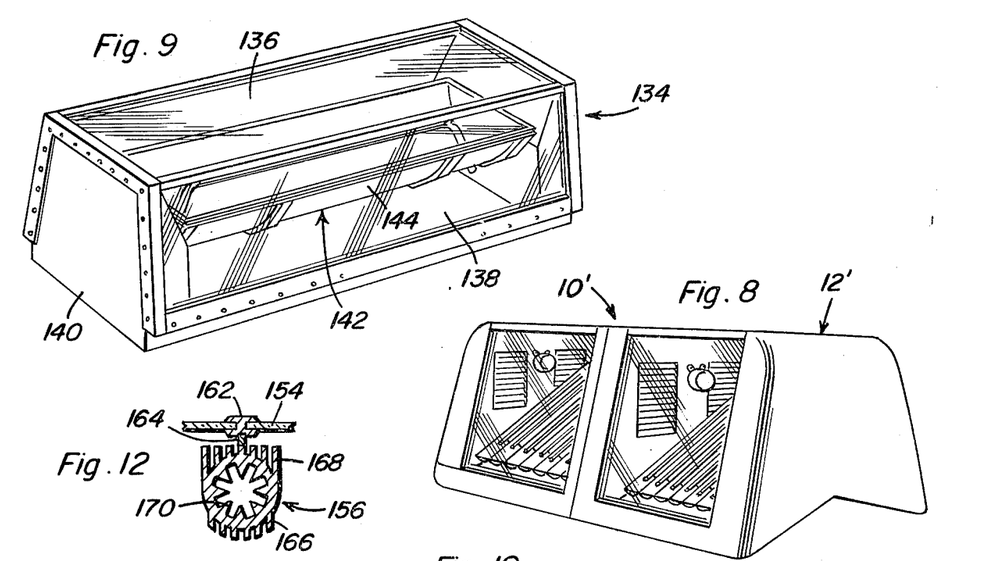
FIG. 8 is a perspective view illustrating a modified form of solar energy collector unit constructed in accordance with the present invention.
FIG. 9 is a perspective view illustrating another form of solar energy collector unit constructed in accordance with the present invention.
FIG. 12 is an enlarged sectional view of a portion of the device shown in FIG. 11.

FIG. 8 illustrates a solar energy collecting unit generally referred to by reference number 10' which is similar in construction and operation to the unit 10 hereinbefore described except that the housing 12' is divided into two separate sections which are operated independently of each other.

FIG. 9 illustrates yet another embodiment of the invention in which a solar energy collecting unit 134 is shown adapted to be mounted on a horizontal surfaced roof but otherwise having a housing of generally trapezoidal shape as in the case of housing 14 hereinbefore described. It should also be appreciated that the unit 10 or 134 may be designed for roofs of any pitch including flat horizontal roofs. The unit 134 in FIG. 9 like the unit 10 includes a top transparent panel 136 and side panels 138 that extend longitudinally between opaque end housing sections 140. Also, a solar energy collecting assembly 142 that extends longitudinally between the opaque end sections 140 is shown. However, the collector assembly 142 includes a single reflector panel 144 that extends parallel to its pivotal axis rather than perpendicular thereto as in the case of reflector panels 50 of collector assembly 44 of the unit 10.

Figure 10:
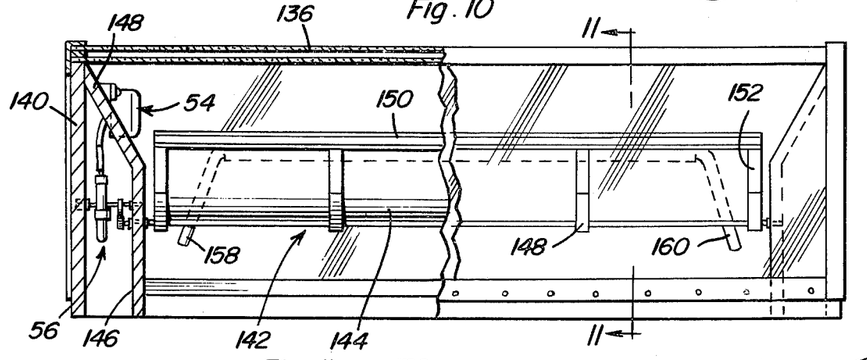
FIG. 10 is an enlarged side elevational view of the energy collector unit shown in FIG. 9 with parts broken away and shown in section.
Figure 11:
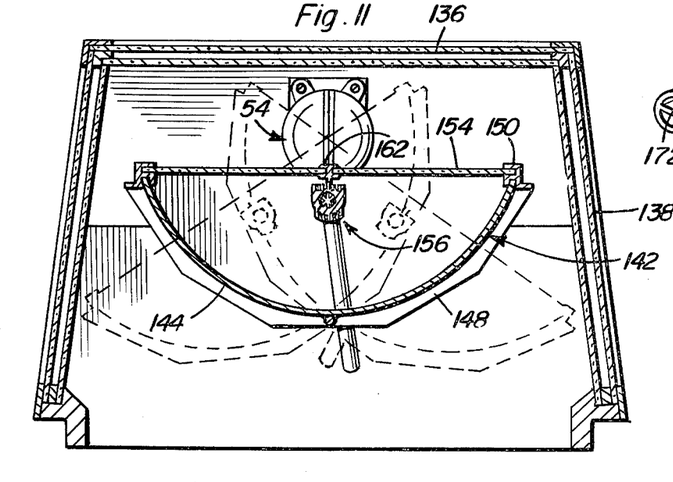
FIG. 11 is an enlarged transverse sectional view taken substantially through a plane indicated by section line 11—11 in FIG. 10.

As more clearly seen in FIGS. 10 and 11, the reflector panel 144 is rotatably supported by bearings mounted in internal walls 146 spaced inwardly from the end sections 140 to form a space at one longitudinal end for a drive device 56. Upwardly diverging wall portions 148 extend from the walls 146 to the top of the end sections 140 to enlarge the solar energy receiving chamber enclosed by panels 136 and 138 above the reflector panel 144. A differential pressure sensor 54 is mounted on one of the wall portions 148 above the drive device 56 to effect automatic tracking movement of the reflector panel 142 as hereinbefore described in connection with collector assembly 44.

The reflector panel 144 is braced intermediate its longitudinal ends by ribs 148 that extend between the extruded longitudinal frame sections 150 secured to the longitudinal edges of the reflector panel. The frame sections 150 also interconnect end bearing sections 152 through which the panel is pivotally supported and driven at one end by the drive device 56. A transparent glass panel 154 is supported by the frame sections 150 as shown in FIG. 11 to enclose a heated space 156 within which a heat receiver tube 158 is suspended. The receiver tube conducts a flow of heating fluid between inlet and outlet conduit sections 158 and 160 that project from the bottom of the panel 144 adjacent its ends.

The receiver tube 156 itself extends horizontally within chamber 156 suspended in close spaced relation below the glass panel 154 along the focal axis of reflector panel curvature. As more clearly seen in FIG. 12, grommets 162 fitted into holes formed in the glass panel 154 support the receiver tube by means of non-conductive spacers 164. The receiver tube in additional to having a black radiant energy receiver surface, has external fins 166 and 168 and internal projections 170 for enhancing heat transfer and uniform heat distribution.

Figure 14:
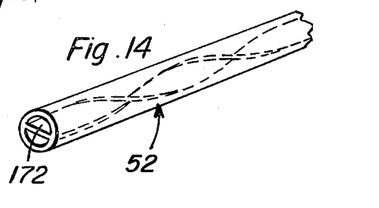
FIG. 14 is a perspective view of a portion of a heat receiver tube that may be utilized with the energy collector units of the present invention.

FIG. 14 illustrates a modified form of heat receiver tube 52' that may be used in the energy collector unit. The tube 52 has fixedly mounted therein a spiral band 172 by means of which a vortical flow component is imparted to fluid conducted through the receiver tube. Uniform heat transfer and distribution is thereby enhanced.

Figures 15, 16, 17:
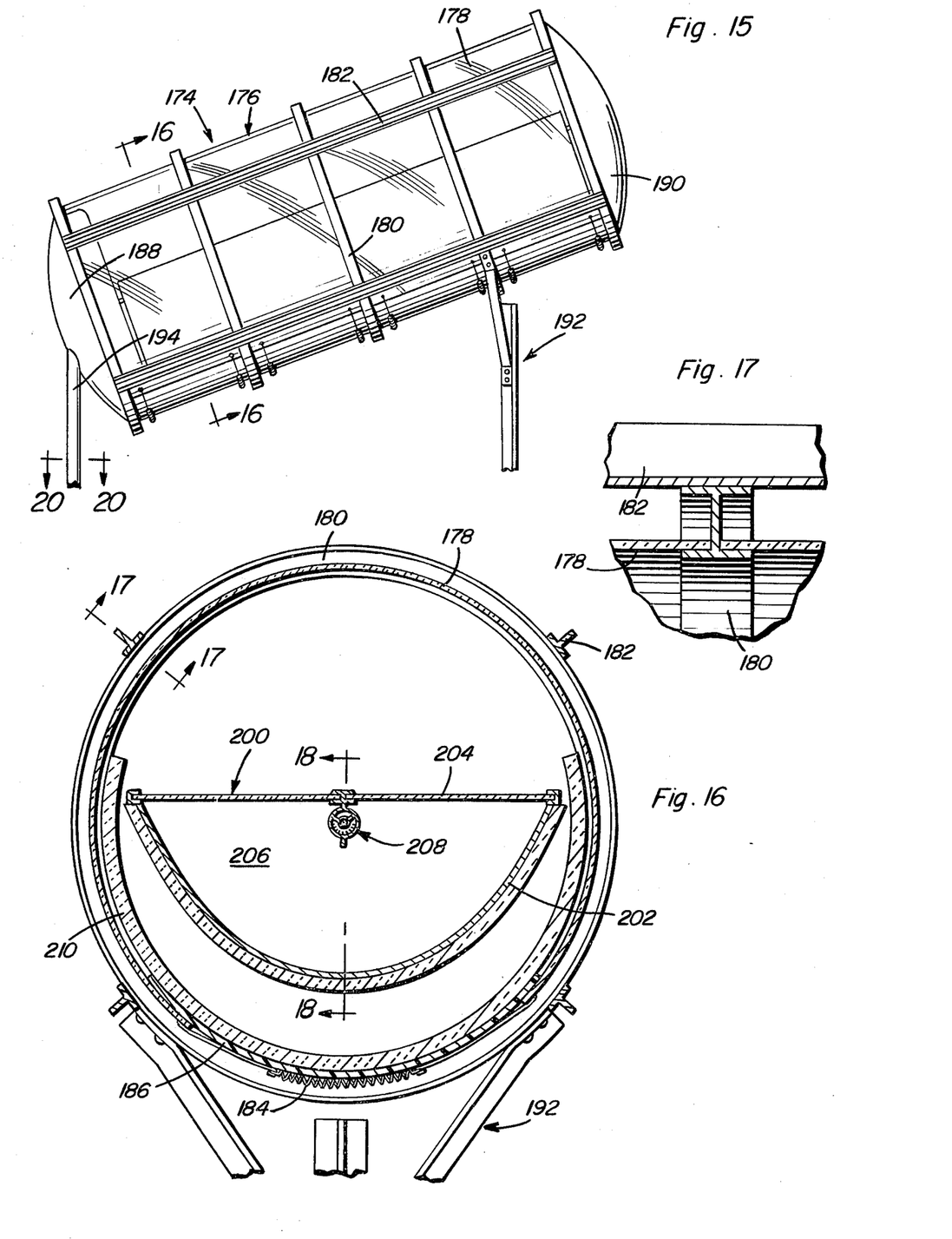
FIG. 15 is a side elevation view of another preferred form of solar energy collector unit constructed in accordance with the present invention.
FIG. 16 is a transverse section view taken substantially through a plane indicated by section line 16—16 in FIG. 15.
FIG. 17 is an enlarged partial section view taken substantially through a plane indicated by section line 17—17 in FIG. 16.

Another sun-tracking, solar energy collector 174 is shown in FIG. 15 and includes a generally cylindrical housing 176 formed by transparent panels 178. The panels 178 are interconnected in axial alignment with each other by circular connectors 180 having I-beam cross-sections. The connectors are fixedly spaced from each other in an axial direction by circumferentially spaced, longitudinal braces 182 of T-beam cross-section. The connectors 180 and braces 182 form a support frame for the panels 178 which are angularly displaceable about the axis for the cylindrical housing against the bias of springs 184 supported by stationary panels 186 fixed to the connectors 180 as more clearly seen in FIG. 16. The panels 178 may therefore be displaced to expose openings on either side of the fixed panels 186 to provide access to the interior of the housing.

The housing is closed at opposite axial ends by curved end walls 188 and 190 as seen in FIG. 1 and is supported in a desired orientation by a braced support assembly 192 connected to the support frame. The end wall 188 at the lower end of the housing has a conduit assembly 194 extending therefrom through which inlet and outlet passages 196 and 198 conduct fluid to and from the energy concentrator. A differential sensor such as 54 hereinbefore described is enclosed within the housing adjacent end wall 188 for exposure to solar energy and is connected to a gravitational drive device such as 56 hereinbefore described. The drive device is connected to an energy concentrator generally referred to by reference numeral 200 which includes a parabolic reflector 202 as shown in FIG. 16, connected to a flat transparent panel 204 to enclose a heat receiving chamber 206. The concentrator 200 receives solar energy or radiation from the sun that enters the panels 178 and the panel 204 to be reflected from one side of the reflector 202 for convergence onto an energy receiving tube assembly 208 aligned with the axis of the cylindrical housing 176. Loss of heat from the chamber 206 is reduced by insulation 210 lining the fixed panels 186 and extending therefrom above the concentrator in its neutral position as shown in FIG. 16.

Figure 18:
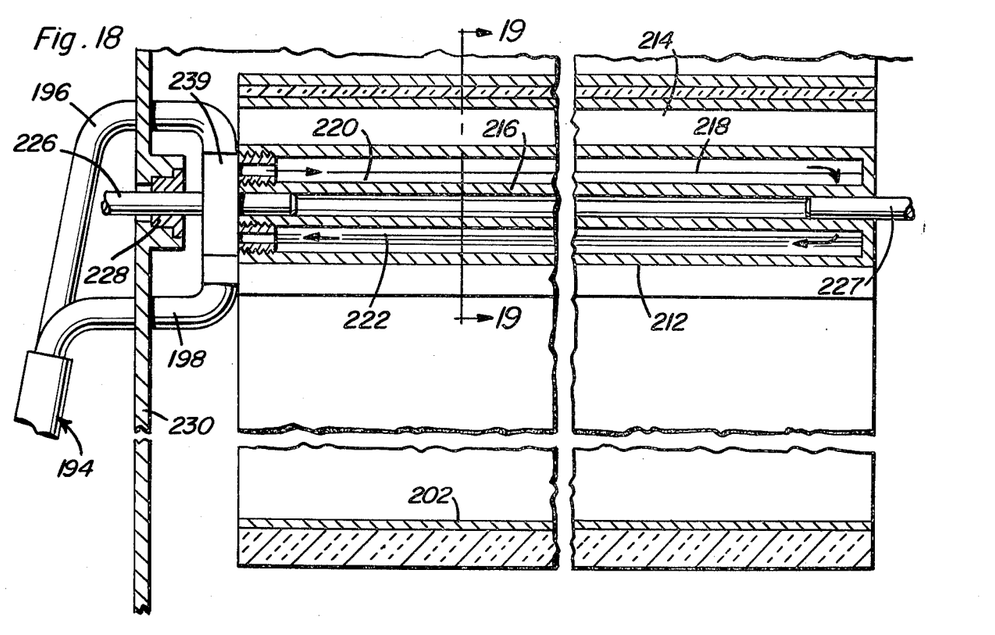
FIG. 18 is an enlarged partial section view taken substantially through a plane indicated by section line 18—18 in FIG. 16.
Figure 19:
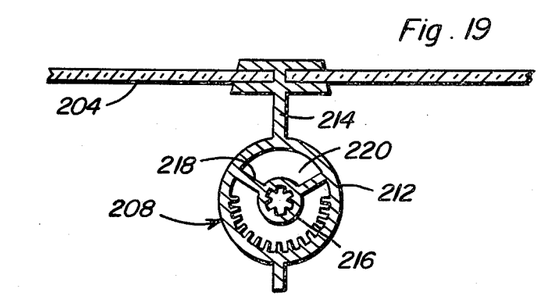
FIG. 19 is a partial section view taken substantially through a plane indicated by section line 19—19 in FIG. 18.
Figure 20:
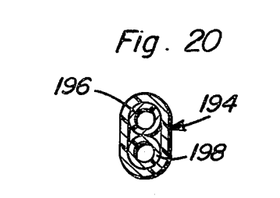
FIG. 20 is an enlarged partial section view taken substantially through a plane indicated by section line 20—20 in FIG. 15.

As more clearly seen in FIG. 19, the tube 208 is made of a heat conductive material having an outer tubular member 212 suspended by hangar 214 from the panel 204. An inner tubular core 216 is positioned by diverging supporting webs 218 coaxially within the outer tubular member 212 in axial alignment with the axis of the housing. The webs 218 separate an uppeer axial passage 220 from a lower and cross-sectionally larger axial passage 222 within the outer tubular member internal fins 224 project radially from the outer tubular member within the passage 222. The concentrator is mounted for angular displacement about the housing axis by shafts 226 and 227 connected to axial end portions of the inner tubular core 216 as shown in FIG. 18. The shaft 226 is driven by the gravitational drive device 56 for sun-tracking movement of the concentrator 200 and is supported by bearings 228 in partition wall 230. The passages 220 and 222 respectively communicate with the inlet and outlet conduits 196 and 198 through any suitable gland assembly 232 well known to those skilled in the art. Fluid is accordingly circulated through the tube assembly 208 as shown by the arrows in FIG. 18. The cooler incoming air entering passage 220 will accordingly be preheated directly by solar radiation and the heat accumulated in chamber 206 through conduction, while the preheated air conducted through passage 222 will be further heated by reflected radiation concentrated on the lower portion of the outer tubular member 212. Heat transfer between the tubular member and the air in passage 222 is enhanced by the fins 224.

Figure 21:
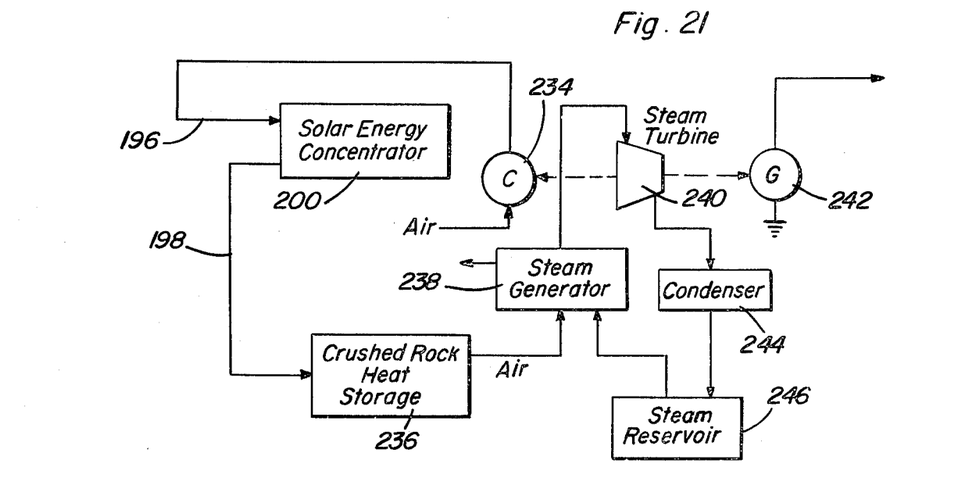
FIG. 21 is a schematic circuit diagram of a heat energy utilization system associated with the energy collector unit shown in FIG. 15.

As diagrammatically shown in FIG. 21, a compressor 234 supplies air to the concentrator 200 through inlet conduit 196. The air is heated in the concentrator and conducted by outlet conduit 198 to an underground heat storage 236 of the crushed rock type, for example. Heated air from the storage is supplied to a steam generator 238 from which steam is fed to a steam turbine 240. The turbine drives the compressor 234 and an electric generator 242 from which useful energy output is obtained. The spent steam is delivered from the turbine to a condenser 244 from which condensed water is returned to a water reservoir 246 for recirculation to the steam generator.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with an energy collector receiving radiant energy from a moving source, automatic tracking means including means mounting said collector for movement along a predetermined path, fluid sensing means for producing a differential fluid pressure in response to reception of said radiant energy from the source reflecting movement thereof, and gravitational drive means connected to the fluid sensing means for imparting said movement to the collector in response to said differential fluid pressure, said gravitational drive means including a balancing tube having opposite inlet ends, means pivotally mounting the tube for angular movement about a fixed axis, a separating mass displaceably retained within said tube intermediate said inlet ends, conduit means connecting the fluid sensing means to the inlet ends of the tube for displacement of said mass to shift the center of gravity of the tube relative to said fixed axis, and gear means drivingly connecting the tube to the collector for transmitting said angular movement of the tube in response to the differential fluid pressure applied to the inlet ends of the tube.

2. The combination of claim 1 wherein said fluid sensing means includes a pair of fluid chambers respectively receiving radiant energy in different directions from the source, insulating means non-conductively separating said fluid chambers, and outlet tubes respectively connecting said chambers to the inlet ends of the balancing tube through the conduit means of the gravitational drive means.

3. The combination of claim 2 wherein said collector includes a reflector variably positioned by the drive means, heat absorbing means connected to the reflector for receiving converging radiant energy rays reflected from the reflector in all positions thereof, duct means for conducting a flow of air in heat exchange relation to the heat absorbing means and means for conducting a heat transfer liquid through the heat absorbing means.

4. The combination of claim 3 wherein said heat absorbing means includes a tubular conduit having heat radiating fins mounted internally thereof.

5. The combination of claim 1 wherein said collector includes a reflector variably positioned by the drive means, heat absorbing means connected to the reflector for receiving converging radiant energy rays reflected from the reflector in all positions thereof, duct means for conducting a flow of air in heat exchange relation to the heat absorbing means and means for conducting a heat transfer liquid through the heat absorbing means.

6. The combination of claim 5 wherein said heat absorbing means includes a tubular conduit having heat radiating fins mounted internally thereof.

7. In combination with an energy collector receiving radiant energy from a moving source, automatic tracking means including means mounting said collector for movement along a predetermined path, fluid sensing means for producing a differential fluid pressure in response to reception of said radiant energy from the source reflecting movement thereof, and gravitational drive means connected to the fluid sensing means for imparting said movement to the collector in response to said differential fluid pressure, said fluid sensing means including a pair of fluid chambers continuously receiving radiant energy in different directions from the source, insulating means nonconductively separating said fluid chambers to maintain differential pressures therein, and outlet tubes respectively connecting said chambers to the drive means for applying said differential pressures to the drive means.

8. In combination with an energy collector receiving radiant energy from a moving source, an energy concentrator, automatic tracking means including means mounting said concentrator for movement along a predetermined path, fluid pressure sensing means responsive to differential heating by said radiant energy emitted from the source in different directions for producing a displacing force, and gravity operated means for multiplying said displacing force to impart movement to the concentrator.

9. In combination with an energy collector receiving radiant energy from a moving source, an energy concentrator, automatic tracking means including means mounting said concentrator for movement along a predetermined path, fluid pressure means responsive to differential heating by said radiant energy for producing a displacing force, and gravity operated means for multiplying said displacing force to impart movement to the concentrator, said gravity operated means comprising a balancing tube having opposite inlet ends, means pivotally mounting the tube for angular movement about a fixed axis, a separating mass displaceably retained within said tube intermediate said inlet ends, conduit means connecting the fluid pressure sensing means to the inlet ends of the tube for displacement of said mass to shift the center of gravity of the tube relative to said fixed axis, and gear means drivingly connecting the tube to the concentrator for transmitting said angular movement of the tube in response to the differential fluid pressure applied to the inlet ends of the tube.

10. In combination with an energy collector receiving radiant energy from a moving source, an energy concentrator, automatic tracking means including means mounting said concentrator for movement along a predetermined path, fluid pressure means responsive to differential heating by said radiant energy for producing a displacing force, and gravity operated means for multiplying said displacing force to impart movement to the concentrator, said collector including a transparent housing having a longitudinal axis about which said concentrator is angularly displaceable by the automatic tracking means said concentrator including a curved reflector disposed within said housing, a transparent panel connected to said reflector to enclose a heat receiving chamber and a heat absorbing tube suspended from said panel in parallel relation to said longitudinal axis within the heat receiving chamber.

11. The combination of claim 10 including means drivingly connecting the automatic tracking means to the heat absorbing tube for imparting angular displacement to the concentrator about the longitudinal axis.

12. The combination of claim 11 wherein said heat absorbing tube includes an outer tubular member, an inner core, and partitioning web means forming separated passages about the core within the tubular member for conducting fluid in opposite directions.

13. The combination of claim 12 wherein said reflector concentrates radiation onto the outer tubular member for heat transfer only to one of the passages therein.

14. The combination of claim 13 wherein said connecting means extends into the core.

15. In combination with a transparent housing having a longitudinal axis, an energy concentrator comprising a curved reflector, a transparent panel connected to said reflector to enclose a heat receiving chamber, a heat absorbing tube and means connected to said panel for suspending the tube therefrom in parallel relation to said longitudinal axis within the heat receiving chamber.

16. The combination of claim 15 wherein said heat absorbing tube includes an outer tubular member, an inner core, and partitioning web means forming separated passages about the core within the tubular member for conducting fluid in opposite directions.

17. The combination of claim 16 wherein said reflector concentrates radiation onto the outer tubular member for heat transfer only to one of the passages therein.

18. The combination of claim 8 wherein said tracking means further includes means for returning the concentrator to a central position in response to zero heating differential or substantially no reception of radiant energy from said source.

19. The combination of claim 6 including tracking means connected to the energy concentrator for displacement thereof about said longitudinal axis of the housing.

* * * * *